United States Patent
Asanoi et al.

(10) Patent No.: US 9,348,074 B2
(45) Date of Patent: May 24, 2016

(54) METHOD FOR PRODUCING OPTICAL LAMINATE

(75) Inventors: Yoshiaki Asanoi, Ibaraki (JP); Toru Umemoto, Ibaraki (JP); Shoichi Matsuda, Ibaraki (JP); Tadayuki Kameyama, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 203 days.

(21) Appl. No.: 14/114,098

(22) PCT Filed: Apr. 5, 2012

(86) PCT No.: PCT/JP2012/059412
§ 371 (c)(1),
(2), (4) Date: Oct. 25, 2013

(87) PCT Pub. No.: WO2012/147491
PCT Pub. Date: Nov. 1, 2012

(65) Prior Publication Data
US 2014/0048200 A1 Feb. 20, 2014

(30) Foreign Application Priority Data
Apr. 26, 2011 (JP) .................................. 2011-097725

(51) Int. Cl.
| | | |
|---|---|---|
| B29C 65/00 | (2006.01) |
| B32B 27/24 | (2006.01) |
| B32B 37/26 | (2006.01) |
| B32B 38/10 | (2006.01) |
| B32B 43/00 | (2006.01) |
| G02B 5/30 | (2006.01) |

(52) U.S. Cl.
CPC ............. *G02B 5/3016* (2013.01); *G02B 5/305* (2013.01)

(58) Field of Classification Search
USPC .................................................. 156/247, 278
See application file for complete search history.

(56) References Cited

U.S. PATENT DOCUMENTS

| | | | |
|---|---|---|---|
| 6,784,954 B2 * | 8/2004 | Yamaoka et al. .............. 349/96 |
| 2002/0131172 A1 | 9/2002 | Hayashi et al. | |

(Continued)

FOREIGN PATENT DOCUMENTS

| | | |
|---|---|---|
| CN | 1519621 A | 8/2004 |
| CN | 101806932 A | 8/2010 |

(Continued)

OTHER PUBLICATIONS

Chinese Office Action dated Feb. 4, 2015, issued in corresponding CN Patent Application No. 201280020165.4 with English translation (20 pages).

(Continued)

*Primary Examiner* — Sing P Chan
(74) *Attorney, Agent, or Firm* — Westerman, Hattori, Daniels & Adrian, LLP

(57) ABSTRACT

A method for producing an optical laminate including a film substrate and a polarizing layer which comprises the steps of: (A) laminating a re-releasable film on one main surface of the film substrate to obtain a laminate film substrate; B) performing a rubbing treatment on the other main surface of the film substrate of the laminate film substrate; C) coating the rubbing-treated surface of the film substrate with a solution containing a lyotropic liquid crystal compound and a solvent; and D) detaching the re-releasable film from the laminate film substrate.

14 Claims, 2 Drawing Sheets

(56) References Cited

U.S. PATENT DOCUMENTS

| | | |
|---|---|---|
| 2004/0156104 A1 | 8/2004 | Hayashi et al. |
| 2010/0128216 A1 | 5/2010 | Umemoto et al. |
| 2012/0148737 A1 | 6/2012 | Komatsubara et al. |

FOREIGN PATENT DOCUMENTS

| | | |
|---|---|---|
| JP | 04-043323 A | 2/1992 |
| JP | 09-286160 A | 11/1997 |
| JP | 2002-311246 A | 10/2002 |
| JP | 2003-107244 A | 4/2003 |
| JP | 2005-206689 A | 8/2005 |
| JP | 2007-125854 A | 5/2007 |
| JP | 2009-145854 A | 7/2009 |
| JP | 2009-199043 A | 9/2009 |
| JP | 2011-28039 A | 2/2011 |
| TW | 200940667 A | 10/2009 |
| TW | I352728 B | 11/2011 |

OTHER PUBLICATIONS

International Search Report for PCT/JP2012/059412, Mailing Date of Jun. 26, 2012.

Office Action dated May 27, 2015, issued in corresponding Japanese Patent Application No. 2011-097725 with English translation (4 pages).

Taiwanese Office Action dated Apr. 11, 2014, issued in Taiwanese Patent Application No. 101113652 with English translation (8 pages).

Japanese Office Action dated Nov. 6, 2014, issued in corresponding JP application No. 2011-097725, with English Translation (4 pages).

* cited by examiner

FIG. 2
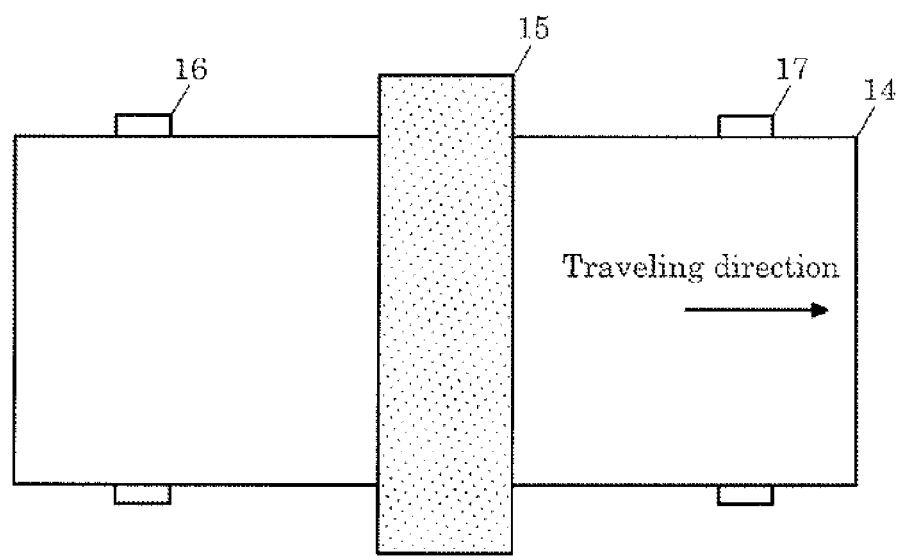
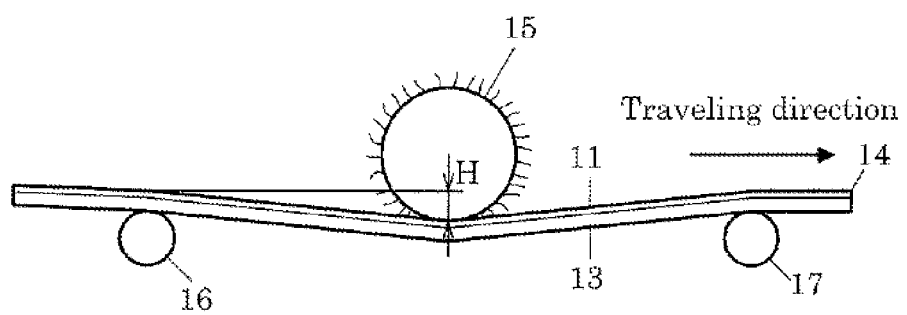

METHOD FOR PRODUCING OPTICAL LAMINATE

BACKGROUND OF THE INVENTION

The present invention relates to a method for producing an optical laminate.

DESCRIPTION OF RELATED ART

A general-purpose polarizing film is made by stretching a polyvinyl alcohol film to be dyed with iodine (there is also a method for producing a polarizing film by stretching after dyeing). On the other hand, a polarizing layer produced by coating a surface of a rubbing-treated film substrate with a solution containing a lyotropic liquid crystal compound is known (For instance, Japanese Unexamined Patent Application Publication No. JP 2002-311246 A). The latter polarizing layer is promising because the polarizing layer has a less thickness than the former polarizing film has.

However, a polarizing layer obtained by a conventional production method, i.e., a production method by coating a surface of a rubbing-treated film substrate with a solution containing a lyotropic liquid crystal compound, has a problem of poor uniformity in appearance.

SUMMARY OF THE INVENTION

It is an object of the present invention to realize a method for producing an optical laminate having a polarizing layer superior in uniformity in appearance, which has a small thickness.

The summary of the present invention is described as below.

In a first preferred aspect of the present invention, a method for producing an optical laminate including a film substrate and a polarizing layer according to the present invention comprises the following steps of: (A) laminating a re-releasable film on one main surface of the film substrate to obtain a laminate film substrate; (B) performing a rubbing treatment on the other main surface of the film substrate of the laminate film substrate; (C) coating the rubbing-treated surface of the film substrate with a solution containing a lyotropic liquid crystal compound and a solvent; and (D) detaching the re-releasable film from the laminate film substrate.

In a second preferred aspect of the method for producing an optical laminate according to the present invention, a material for forming the film substrate is one of a cycloolefin-based polymer film and a cellulose-based polymer film.

In a third preferred aspect of the method for producing an optical laminate according to the present invention, a material for forming the re-releasable, film is one of an ester-based polymer film and an acrylic-based polymer film.

In a fourth preferred aspect of the method for producing an optical laminate according to the present invention, the film substrate has a thickness of 20 μm to 50 μm, the re-releasable film has a thickness of 30 μm to 150 μm, and the laminate film substrate has a thickness of 100 μm to 200 μm.

In a fifth preferred aspect of the method for producing an optical laminate according to the present invention, the rubbing treatment is a rubbing treatment of a tension web method.

In a sixth preferred aspect of the method for producing an optical laminate according to the present invention, the liquid crystal compound is any one of an azo compound, an anthraquinone compound, a perylene compound, a quinophthalene compound, a naphthoquinone compound, a merocyanone compound or a mixture of those.

In a seventh preferred aspect of the method for producing an optical laminate according to the present invention, the solvent is any one of water, an alcohol kind, a ketone kind, a CELLOSOLVE (ethylene glycol mono-ethyl ether) kind or a mixed solvent of those.

In an eighth preferred aspect of the method for producing an optical laminate according to the present invention, a system for coating with the solution is any one of a wire bar, a gap coater, a comma coater, a gravure coater or a slot die.

ADVANTAGE OF THE INVENTION

According to the present invention, it is possible to obtain a thin optical laminate with a polarizing layer that is superior in uniformity in appearance.

BRIEF DESCRIPTION OF THE DRAWINGS

FIG. 2 is a schematic view of a rubbing treatment to be used in the present invention.

DESCRIPTION OF THE PREFERRED EMBODIMENTS

Figure 1:
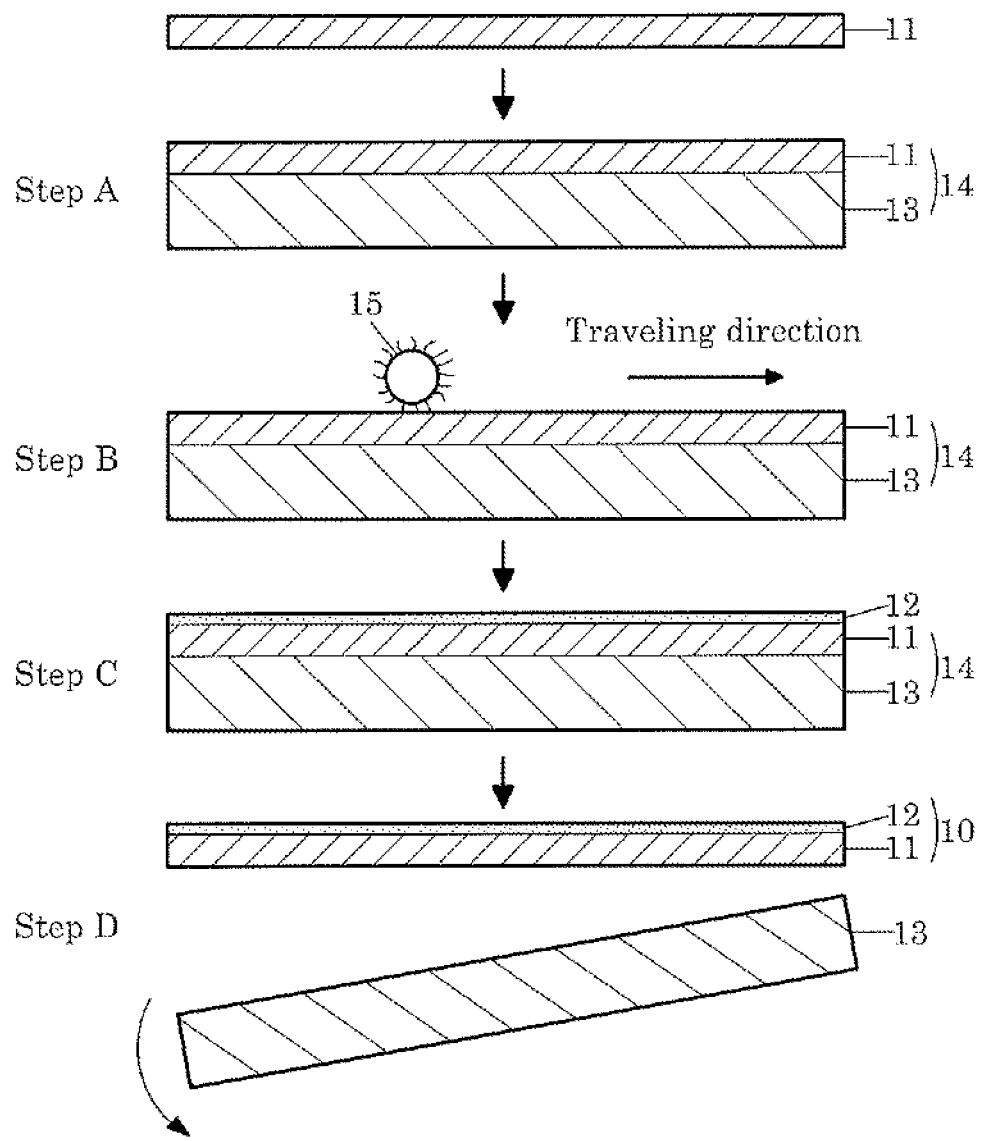
FIG. 1 is a process view indicating steps in a method for producing an optical laminate of the present invention.

According to researches of the inventors of the present invention, the causes of deterioration in uniformity in appearance of a polarizing layer in a conventional production method are described as below. When a film substrate, has a small thickness, rigidity of the film substrate runs short, resulting in generation of wrinkles and deflection. Wrinkles and deflection of the film substrate make rubbing treatment and coating with a coating fluid unstable. In the case where there are wrinkles in the film substrate, there is a possibility that pressure of the rubbing treatment may be focused on each protection part of the wrinkles and a coating fluid is focused on each recess portion of the wrinkles. Further, in the case where the film substrate has deflection, there is a possibility that the coating fluid may be focused on each recess portion of the deflection. This makes the uniformity in appearance of the polarizing layer deteriorated. The thin film substrate means herein that the film substrate typically has a thickness of 50 μm or lower.

In the present invention, a re-releasable film is preliminarily laminated on a surface of the film substrate on which side no rubbing treatment is performed (that is, a surface that is not coated with a solution containing a lyotropic liquid crystal compound) and the thickness of the laminate film substrate after lamination is typically set at 80 μm or greater. When the film substrate and the re-releasable film respectively have self-adhesiveness, no adhesion layers are particularly needed. When the film substrate, and the re-releasable film respectively do not have self-adhesiveness, it is preferable to add an adhesion layer to the re-releasable film. A rubbing treatment is performed in this state to coat with a solution containing a lyotropic liquid crystal compound. The laminate film substrate does not easily have wrinkles and deflection because of greater thickness and higher rigidity thereof compared with the single-layer film substrate. This makes it possible to stably perform a rubbing treatment and coating with a solution. As a result, it is possible to obtain a polarizing layer superior in uniformity in appearance.

Subsequently, the re-releasable film is detached from the laminate film substrate. This makes it possible to obtain an optical laminate which comprises the film substrate and the polarizing layer containing a lyotropic liquid crystal compound. The obtained optical laminate has a small thickness (thin-typed).

[Production Method of the Present Invention]

The present invention relates to a method for producing an optical laminate 10 shown in FIG. 1. The optical laminate 10 obtained by the production method of the present invention includes a film substrate 11 and a polarizing layer 12. The production method of the present invention includes steps A to D shown in FIG. 1. The production method of the present invention may include another steps before and after or between steps A to D.

In step A, a re-releasable film 13 is laminated on one main surface of a film substrate 11 to obtain a laminate film substrate 14. In step B, a rotating rubbing roll 15 is pressed on the other main surface of the film substrate 11 to perform a rubbing treatment. In step C, a surface of the film substrate 11 after having been rubbing-treated is coated with a solution containing a lyotropic liquid crystal compound. After the alignment of the liquid crystal compound, a layer of the solution containing the liquid crystal compound becomes a polarizing layer 12. In step D, the re-releasable film 13 is detached.

[Step A]

In step A, the re-releasable film 13 is laminated on one main surface of the film substrate 11 to obtain the laminate film substrate 14. To obtain a thin-type optical laminate 10, the film substrate 11 preferably has a thickness of 50 μm or smaller, more preferably has a thickness of 20 μm to 50 μm. To obtain a polarizing layer 12 superior in uniformity in appearance, the laminate film substrate 14 needs to have sufficient rigidity. Accordingly, the laminate film substrate 14 preferably has a thickness of 80 μm or greater, more preferably has a thickness of 100 μm to 200 μm. In view of the thickness of the aforementioned film substrate 11 and the thickness of the laminate film substrate 14, the re-releasable film 13 preferably has a thickness of 30 μm to 150 μm.

For instance, when the thickness of the film substrate 11 is 50 μn, the thickness of the re-releasable film 13 is preferably 30 μm or greater. When the thickness of the film substrate 11 is 20 μm, the thickness of the re-releasable film 13 is preferably 60 μm or greater.

The laminate film substrate 14 has rigidity higher than the film substrate 11 alone has and does not easily have wrinkles and deflection. This makes it possible to stably perform a rubbing treatment of the laminate film substrate 14 and uniformly coat the laminate film substrate 14 with a solution.

While a material for the film substrate 11 is not particularly limited, the material preferably has high smoothness and transparency. The material for forming the film substrate 11 typically includes a cycloolefin-based polymer film and a cellulose-based polymer film.

An aligned layer (not shown) composed of vinyl alcohol-based polymer or the like may be formed on a surface where the film substrate 11 is rubbing-treated so as to increase alignment properties of the lyotropic liquid crystal compound.

A film on which a re-releasable adhesive layer (not shown) is formed on one main surface of the film is used as a re-releasable film 13. A material for the re-releasable film 13 preferably has high smoothness and rigidity. Examples of the material for forming the re-releasable film 13 include an ester-based polymer film and an acrylic-based polymer film.

[Step B]

In step B, a rubbing treatment is performed by pressing the rubbing roll 15 to a main surface of the film substrate 11 of the laminate film substrate 14 obtained in the step A. The rubbing treatment is performed so as to unidirectionally align the lyotropic liquid crystal compound to be coated in the step C.

Rubbing treatment is performed by typically pressing the rubbing roll 15 to a surface of the film substrate 11 in a traveling laminate film substrate 14 while rotating the rubbing roll 15 with a rubbing cloth having piles wrapped.

A material for a rubbing cloth is not particularly limited, and cotton or rayon is typically used. An angle formed by a rotation axis of the rubbing roll 15 and a traveling direction of the laminate film substrate 14 is appropriately set according to purpose.

FIG. 2 shows an embodiment of a preferable rubbing treatment. The laminate film substrate 14 is caused to travel while supporting a surface of the re-releasable film 13 side, of the long laminate film substrate 14 with a first guide roll 16 and a second guide roll 17. The first guide roll 16 is located on a traveling upstream side of the laminate film substrate 14 and the second guide roll 17 is located on a traveling downstream side of the laminate film substrate 14.

A rubbing treatment is performed by pressing the rubbing roll 15 to a surface of the film substrate 11 side of the laminate film substrate 14 between the first guide roll 16 and the second guide roll 17. A pushing depth H of the rubbing roll 15 is appropriately set so as to uniformly align the lyotropic liquid crystal compound.

A rubbing treatment method shown in FIG. 2 is a tension web type-rubbing treatment: and is characterized in that there is no back roll of the rubbing roll 15. With the use of a tension web-type rubbing treatment, the rubbing treatment is uniformly performed because uniform form tension is provided in a width direction. This makes it possible to obtain an optical laminate having a polarizing layer superior in uniformity in appearance.

When the laminate film substrate 14 ravels, the first guide roll 16 and the second guide roll 17 support a surface of the re-releasable film 13 side of the laminate film substrate 14 while rotating. While the material and the size of the first guide roll 16 and the second guide roll 17 are not limited, the material is generally made of rubber or a metal and the diameter thereof is 10 mm to 500 mm. The material and the size, of the first guide roll 16 may be identical to or different from the material and the size of the second guide roll 17.

[Step C]

In step C, the rubbing-treated surface of the laminate film substrate 14 obtained in step B is coated with a solution containing a lyotropic liquid crystal compound to obtain a polarizing layer 12.

The solution containing a lyotropic liquid crystal compound to be used in the present invention usually contains a lyotropic liquid crystal compound and a solvent. The lyotropic liquid crystal compound is a compound which exhibits liquid crystallinity in the state of being dissolved in the solvent. Examples of the lyotropic liquid crystal compound to be used in the present invention preferably include an azo compound, an anthraquinone compound, a perylene compound, a quinophthalene compound, a naphthoquinone compound, a merocyanine compound and a mixture of those.

The solvent to be used in the present invention is preferably water, an alcohol kind, a ketone kind, a CELLOSOLVE (ethylene glycol mono-ethyl ether) kind and a mixed solvent of those. The content of a lyotropic liquid crystal compound contained in the solution is preferably 2% by weight to 30% by weight of a total weight of the solution containing the lyotropic liquid crystal compound.

A coating system to be used in the present invention is not particularly limited as long as the coating system can uniformly coat a surface of the laminate film substrate 14 with a solution containing a lyotropic liquid crystal compound. Examples of the coating system typically include a wire bar, a gap coater, a comma coater, a gravure coater, and a slot die. The coated solution containing a lyotropic liquid crystal compound may be naturally dried and may be dried by heating.

[Step D]

In step D, the re-releasable film 13 is detached to obtain an optical laminate 10 (a laminate of the film substrate 11 and the polarizing layer 12). A detaching system of the re-releasable film 13 is not particularly limited, but may be publically known Stripping equipment or a detachment by inputting.

[Optical Laminate]

The optical laminate 10 obtained according to the present invention includes the film substrate 11 and the polarizing layer 12 formed on the film substrate 11. The polarizing layer 12 exhibits absorption dichrorism at either wavelength of a visible light region (at an wavelength of 380 nm to 780 nm) and has an absorption axis in one direction of the main surface. Absorption dichroism is obtained by the alignment of the lyotropic liquid crystal compound in the polarizing layer 12.

The content of a lyotropic liquid crystal compound contained in the polarizing layer 12 is preferably 80% by weight to 100% by weight of the total weight.

The optical laminate 10 preferably has a thickness of 20 μm to 60 μm. The polarizing layer 12 preferably has a thickness of 0.1 μm to 10 μm.

EXAMPLES

Example

A long film substrate 11 (thickness: 40 μm) composed of a cycloolefin polymer film (manufactured by ZEON CORPORATION; Product name: ZEONOR) was prepared. A long re-releasable film 13 (thickness: 60 μm) composed of a polyethylene terephthalate film on which an adhesive layer was formed was prepared. The re-releasable film 13 was bound to one main surface of the film substrate 11 by laminating to produce a laminate film substrate 14 (step A).

As shown in FIG. 2, a surface of the film substrate 11 was rubbing-treated while causing the laminate film substrate 14 to travel (step B).

Subsequently, the rubbing-treated surface of the film substrate 11 was coated with a solution Containing a lyotropic liquid crystal compound (step C). The solution containing a lyotropic liquid crystal compound was obtained by dissolving an azo compound produced in accordance with Example 1 of Japanese Unexamined Patent Application Publication No. JP 2009-173849 A in water. The solution containing the lyotropic liquid crystal compound was naturally dried to form a polarizing layer 12 with a thickness of 0.4 μm.

Finally, the re-releasable film 13 was detached from the laminate film substrate 14 to obtain an optical laminate 10 (thickness: 0.4 μm) composed of the polarizing layer 12 and the film substrate 11 (step D)

Comparative Example

A film substrate of the same specification as that in Example was rubbing-treated in the same manner as in Example. A solution containing a lyotropic liquid crystal compound of the same specification as that in Example was applied in the same manner as in Example. This was naturally dried in the Same manner as in Example to form a polarizing layer with a thickness of 0.4 μm. An optical laminate with a thickness of 40.4 μm was eventually obtained. In Comparative Example, a re-releasable film was not used unlike Example.

[Evaluation]

The polarizing layer of the optical laminate in Example was uniform in appearance. In contrast, the polarizing layer of the optical laminate in Comparative Example was non-uniform in appearance caused by unstableness of the rubbing treatment and unstableness of the coating.

[Measuring Method]

[Thickness]

The thickness of the film was measured with a digital gauge (manufactured by OZAKI MFG. CO., LTD., product name: PEACOCK).

[Uniformity in Appearance]

A sample cut out from the optical laminate 10 in Example was placed on a white light source while rotating the sample around an axis perpendicular to a main surface to visually observe uniformity in appearance of the polarizing layer. A sample cut out from the optical laminate in Comparative Example was also visually observed in uniformity in appearance of the polarizing layer in the same manner as in Example.

INDUSTRIAL APPLICABILITY

The optical laminate obtained by the production method of the present invention is preferably used for a liquid crystal display such as a liquid crystal television set and a mobile phone or an organic light emitting display.

What is claimed is:

1. A method for producing an optical laminate, comprising the steps of:
    a preliminary step of preparing a film substrate;
    (A) laminating a re-releasable film on one main surface of the film substrate to obtain a laminate film substrate;
    (B) conducting a rubbing treatment on the other main surface of the film substrate of the laminate film substrate;
    (C) applying a solution containing a lyotropic liquid crystal compound and a solvent onto the rubbing-treated surface of the film substrate; and
    (D) releasing the re-releasable film from the laminate film substrate.

2. The method according to claim 1, wherein a material for forming the film substrate is one of a cycloolefin-based polymer film and a cellulose-based polymer film.

3. The method according to claim 2, wherein a material for forming the re-releasable film is one of an ester-based polymer film and an acrylic-based polymer film.

4. The method according to claim 2, wherein the film substrate has a thickness of 20 μm to 50 μm, the re-releasable film has a thickness of 30 μm to 150 μm, and the laminate film substrate has a thickness of 100 μm to 200 μm.

5. The method according to claim 2, wherein the rubbing treatment is a rubbing treatment of a tension web method.

6. The method according to claim 2, wherein the liquid crystal compound is any one of an azo compound, an anthraquinone compound, a perylene compound, a quinophthalene compound, a naphthoquinone compound, a merocyanone compound or a mixture thereof.

7. The method according to claim 2, wherein the solvent is any one of water, an alcohol, a ketone, ethylene glycol monoethyl ether or a thereof mixture.

8. The method according to claim 2, wherein a system for applying the solution is any one of a wire bar, a gap coater, a comma coater, a gravure coater or a slot die.

9. The method according to claim 1, wherein a material for forming the re-releasable film is one of an ester-based polymer film and an acrylic-based polymer film.

10. The method according to claim 1, wherein the film substrate has a thickness of 20 μm to 50 μm, the re-releasable film has a thickness of 30 μm to 150 μm, and the laminate film substrate has a thickness of 100 μm to 200 μm.

11. The method according to claim 1, wherein the rubbing treatment is a rubbing treatment of a tension web method.

12. The method according to claim 1, wherein the liquid crystal compound is any one of an azo compound, an anthraquinone compound, a perylene compound, a quinophthalene compound, a naphthoquinone compound, a merocyanone compound or a mixture thereof.

13. The method according to claim 1, wherein the solvent is any one of water, an alcohol, a ketone, ethylene glycol mono-ethyl ether or a mixture thereof.

14. The method according to claim 1, wherein a system for applying the solution is any one of a wire bar, a gap coater, a comma coater, a gravure coater or a slot die.

\* \* \* \* \*